United States Patent [19]

Durand

[11] 4,287,644
[45] Sep. 8, 1981

[54] COIL LOOP TYPE CABLE TIE

[75] Inventor: Guy Durand, Montville, France

[73] Assignee: Le Grand S. A., Limoges, France

[21] Appl. No.: 115,747

[22] Filed: Jan. 28, 1980

[30] Foreign Application Priority Data

Jan. 30, 1979 [FR] France ................................ 79 02333

[51] Int. Cl.³ ............................................. R65D 63/00
[52] U.S. Cl. ............................... 24/16 PB; 24/17 AP;
24/30.5 P; 24/309; 248/74 PB; 292/318;
24/339
[58] Field of Search ........... 24/16 PB, 17 AP, 73 PB,
24/30.5 P, 20 TT, 17 A, 17 R, 17 B; 248/74 PB;
292/318, 319, 320, 321

[56] References Cited

U.S. PATENT DOCUMENTS

| 2,979,794 | 4/1961 | De Bartolo | 24/17 AP |
| 3,049,771 | 8/1962 | Litwin et al. | 24/73 PB |
| 3,054,585 | 9/1962 | Roberts et al. | 248/74 PB |
| 3,339,246 | 9/1967 | Geisinger | 24/16 PB |
| 3,581,349 | 6/1971 | Verspieren | 248/74 PB |
| 3,632,069 | 1/1972 | Thayer | 248/74 PB |
| 3,632,071 | 1/1972 | Cameron | 248/74 PB |
| 3,735,448 | 5/1973 | Waddington | 24/16 PB |
| 3,816,878 | 6/1974 | Fulton et al. | 24/16 PB |
| 3,967,345 | 7/1976 | Sumimoto | 24/16 PB |

FOREIGN PATENT DOCUMENTS

| 2139091 | 3/1972 | Fed. Rep. of Germany ..... 24/16PB |
| 1126581 | 11/1956 | France . |
| 70048 | 2/1959 | France . |
| 71195 | 10/1959 | France . |
| 1305743 | 8/1962 | France . |
| 1489466 | 7/1967 | France . |
| 2352974 | 5/1976 | France . |
| 2387859 | 11/1978 | France . |
| 1005269 | 9/1965 | United Kingdom . |
| 1418900 | 12/1975 | United Kingdom . |
| 1519868 | 8/1978 | United Kingdom . |

Primary Examiner—Victor N. Sakran
Attorney, Agent, or Firm—Henry R. Lerner

[57] ABSTRACT

A coil toop type cable tie of one-piece molded plastic construction having a flexible strap and a fastening head at one end thereof. The fastening has a passageway running parallel to the strap and a hinged pawl extending into the passageway and having at least one tooth adapted to mesh with ratchet teeth on one side of the strap. The hinged pawl is connected to the fastening head by hinge which defines the closed end of a notch separating the hinged pawl from the rest of the fastening head. The notch opens onto a surface of the hinged pawl opposite to the surface on which its tooth or teeth are formed and preferably angles from its closed end to its open end generally toward the strap.

9 Claims, 13 Drawing Figures

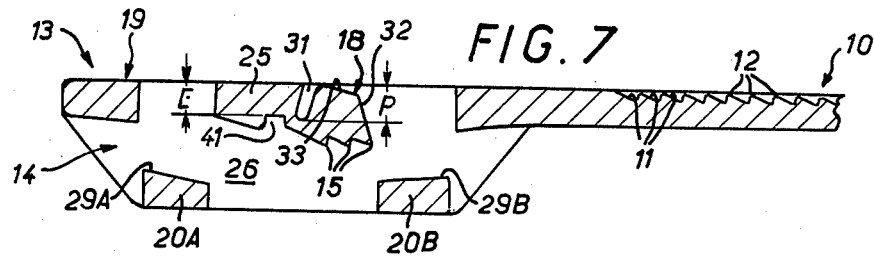
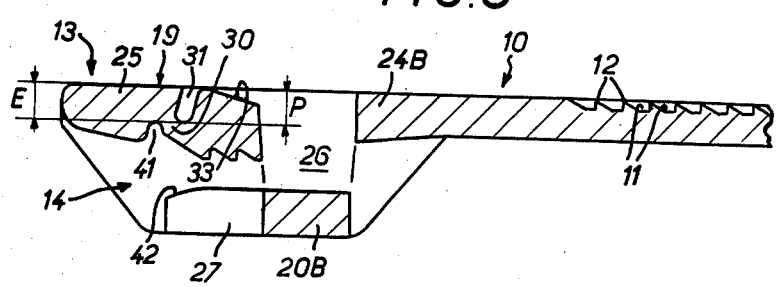
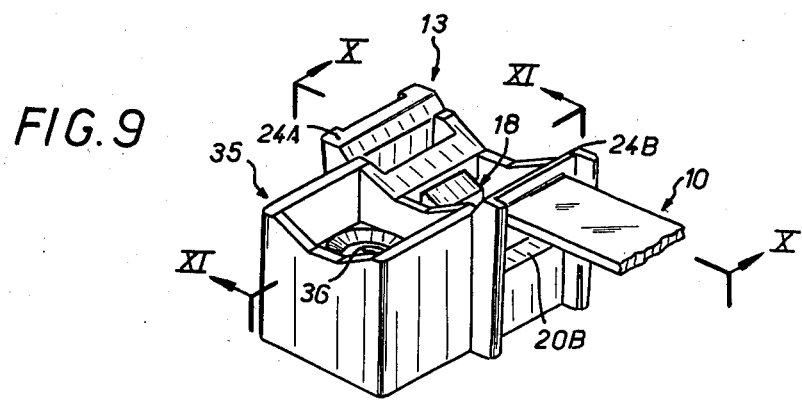
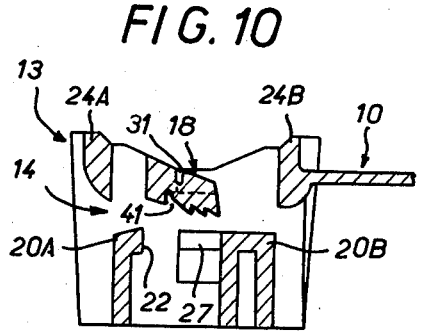
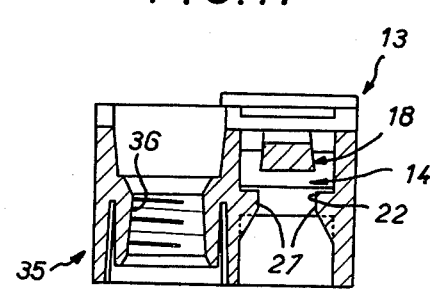
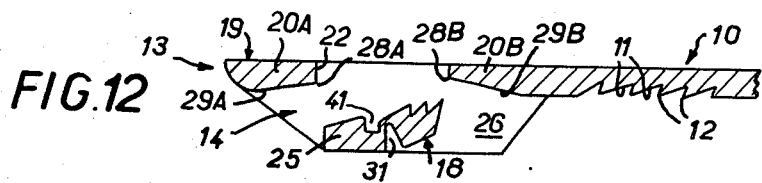

COIL LOOP TYPE CABLE TIE

The present invention relates generally to cable ties of one-piece construction, of the kind comprising a flexible strap having lateral ratchet teeth and a fastening head or frame having a strap-receiving passageway for forming a loop with the strap, at least one lateral retaining tooth being adapted to mesh with one of the ratchet teeth on the strap when the strap is looped through the fastening head.

Cable ties are commonly used to tie various articles, e.g. electric wires, to one another and/or to some kind of support.

They are usually made by molding synthetic plastics material.

From their inception there have been numerous proposals for cable tie constructions. It is possible to group them into two major categories depending on the general orientation of their fastening head or more particularly the passageway in the fastening head in relation to the flexible strap.

First of all, there are coil loop type ties in which the passageway through the fastening head extends parallel to the strap itself so that at the fastening head the strap overlaps its end attached to the fastening head thereby defining what is termed a coil loop. In this arrangement there is no intersection of the path of the strap with itself. Such cable ties are shown namely in French Pat. No. 1,126,581 and better yet in the first patent of addition No. 70,048 to the aforesaid patent.

Next there are cable ties which are referred to as intersecting loop type cable ties in which the passageway through the locking head extends substantially perpendicular to the flexible strap so that when it passes through the fastening head the flexible strap forms a closed loop intersecting at right angles in relation to its end attached to the fastening head. Such constructions are shown in the second patent of addition No. 71,195 to the above-mentioned French Pat. No. 1,126,581.

For some uses at least the coil type cable ties have compared to intersecting loop type cable ties the advantage that their fastening heads protrude less relative to the bundle of cables or other articles that they tie together and therefore have a nicer appearance and are less likely to cause injury particularly if after forming and tightening the loop the free end of the flexible strap is not cut right at the fastening head.

In the above mentioned patents and patents of addition the retaining tooth or teeth on each fastening head protrude directly from a solid part thereof.

For good holding of the strap in its looped position, i.e., to prevent accidental disengagement of the flexible strap, the cable tie is made or relatively rigid material. The synthetic material employed must be a predetermined quality; this entails the use of, for example, a polyamide 11 or 12.

This creates a dual handicap. In the first place the cost is relatively high, as plastics of this type are generally expensive. In addition the engagement force to be exerted to tighten the flexible strap after forming the loop is relatively high, force being exerted to clear the retaining tooth or teeth of the fastening head during tightening of the cable tie, by mere elastic deformation of the material which, as previously mentioned, is relatively rigid.

It has, however, been contemplated to provide the retaining tooth or teeth of the fastening head at the end of a hinged pawl thereby reducing the engagement force necessary and therefore widening the range of potentionally useable plastics.

Most often this arrangement has been applied to intersecting loop type cable ties such as is the case in French Pat. Nos. 1,305,743 and 1,489,466. In French Pat. No. 2,352,974 there is disclosed a coil loop type cable tie in which a hinged pawl is utilised. But in this last mentioned French patent the hinged pawl extends generally perpendicular to the flexible strap in a manner comparable to the hinged pawls of intersecting loop type cable ties when equipped with a hinged pawl.

This has a dual disadvantage. First of all the fastening head of the cable tie disclosed in French Pat. No. 2,352,974 defines a considerable projecting portion relative to the strap itself with the aforesaid attendant disadvantages. In addition the pawl disengagement has been found to be rather poor which is all the more so since the hinged pawl has only one retaining tooth formed directly at its free end.

A general object of the present invention is an arrangement which permits these drawbacks to be overcome and provides in particular satisfactory disengagement action.

According to the invention there is provided a cable tie of one-piece construction comprising a flexible strap having a plurality of lateral ratchet teeth on one side of said strap and a fastening head having a passageway extending parallel to said strap and adapted to receive said strap to form a loop, a hinged pawl having at least one retaining tooth disposed at an end thereof adapted to mesh with any of said plurality of ratchet teeth and a hinge of reduced thickness joining said hinged pawl to said fastening head, said hinged pawl extending generally parallel to said strap, a notch separating said hinged pawl from the rest of said fastening head, said hinge defining the closed end of said notch, and said notch opening outwardly onto a surface of said hinged pawl opposite to a surface on which said retaining tooth is formed.

Thus, the cable tie according to the invention combines the advantages of a coil loop type cable tie with those of an intersecting loop type cable tie. In other words, as the hinged pawl of the present invention is in the heart of the fastening head of a coil loop type cable tie it may, all other things being equal, be made of plastics material other than polyamide 11 or 12, e.g., polyamide 6 or 6.6.

Indeed, owing to the particular disposition of the hinged pawl and the notch separating it from the rest of the fastening head, it has excellent disengagement characteristics: the passageway through the fastening head being formed between a hinged pawl and at least one cross bar member when the tension initially exerted therein for tightening is released, the flexible strap is wedged by the biasing force of the hinged pawl to which it applies a rocking force due to its own retracting movement following the releasing of its tensioning between the cross bar on the fastening head and the hinged pawl.

There results a particularly reliable and dependable locking of the flexible strap.

Now it has been found that the arrangement of the notch between the pawl and the rest of the fastening head contributes to the recoiling movement of the hinged pawl, whereby, in accordance with the invention, the notch opens outwardly onto the surface on the hinged pawl opposite the surface on which the retaining tooth or teeth are formed.

The novelty of this arrangement will be better understood if it is noted that to the present day when such a notch has been provided, as is the case of the above mentioned French Pat. No. 1,489,466, it usually opens outwardly onto the surface of the pawl on which the tooth or teeth formed, or more precisely on the side opposite to the flexible strap.

Preferably, this notch is, in addition, inclined relative to the flexible strap, the slope or inclination also contributing to the sought after recoiling rocking movement of the hinged pawl.

Indeed, during the rearward or retracting movement of the flexible strap, the hinged pawl, which after recoiling takes up the clearance defined by the notch when it comes to bear on a plane formed by one side of the notch spaced from the pawl, and since this plane is inclined the hinged pawl is more assuredly forced to swing.

These and other features and advantages of the invention will be brought out in the description which follows, given by way of example, with reference to the accompanying schematic drawings, in which:

FIGS. 7 and 8 are views similar to FIG. 3 relative to two alternative embodiments;

FIG. 9 is a fragmentary perspective view of an alternative embodiment of the cable tie;

FIGS. 10 and 11 are respectively a longitudinal sectional view and a cross-sectional view of the alternative embodiment of FIG. 9 taken along lines X—X and XI—XI in FIG. 9; and FIG. 12 is a view similar to that of FIG. 3 relating to still another alternative embodiment of the present cable tie.

Figure 6A:
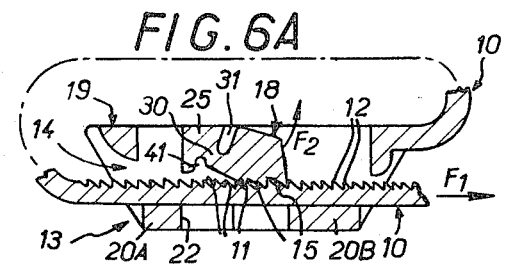
FIGS. 6A, 6B are fragmentary cross-sectional views similar to that of FIG. 3 illustrating the operating mode of the cable tie embodying the invention.

As shown in the drawings, the present cable tie comprises, in a one-piece construction, a flexible strap 10 having along a portion of its length on one side thereof lateral ratchet teeth 11 with crests 12, and a fastening head 13 having in a strap-receiving passageway 14 for forming a loop and for engagement therein, and as shown in phantom lines in FIG. 6A at least one lateral retaining tooth 15 is adapted to mesh with a ratchet tooth 11 on the flexible strap 10.

From the entrance end 16A remote from the flexible strap 10 to the exit end 16B adjacent the flexible strap 10, passageway 14 through fastening head 13 extends substantially parallel to the flexible strap, the latter being assumed to lie flat and the retaining tooth or teeth 15 on the fastening head 13 in the passageway 14 are formed at the end or tip of hinged pawl 18.

In practice, in the embodiment of FIGS. 1 to 6, the passageway 14 through fastening head 13 is formed between a face plate 19 from which the hinged pawl 18 is cut out and which extends substantially in the continuation of the flexible strap 10 and two cross bars, namely an entrance cross bar 20A and an exit cross bar 20B parallel and spaced from the face plate 19 to either side of the hinged pawl 18.

The cross bars 20A and 20B define a cavity 22 between each other in line with the hinged pawl 18 and having the contour as the hinged pawl. The cavity 22 is shaped to permit the passage of a moulding punch adapted to mould the corresponding side of the hinged pawl, and likewise, in line with the cross bars 20A and 20B, face plate 19 has cavities 23A, 23B complementary to the cross bars.

Thus face plate 19 simplifies down to three cross bars, a first or entrance cross bar 24A at the end remote from the strap 10, a second or middle cross bar 25 which carries the hinged pawl 18 and a third or exit cross bar 24B at the end of the fastening head adjacent to the strap and attached thereto.

The various cross bars 20A, 20B, 24A, 24B and 25 together extend between opposed parallel flanges 26 which laterally define the fastening head 13.

In the embodiment illustrated in FIGS. 1 to 6, the cross bar 20B has two side extensions 27 in contact with flanges 26 extending toward the cross bar 20A.

Between side extensions 27 the exit bar 20B has a lateral edge 28B at the end of side 29B which faces face plate 19 which is close to the entrance cross bar 20A.

In the embodiment illustrated in FIGS. 1 to 6, the entrance cross bar 20A also has a lateral edge 28A at the end of its side 29A facing face plate 19 at the end of side 29A closest to the exit cross bar 20B.

Preferably, and as shown, sides 29A, 29B of the cross bars 20A and 20B are substantially plane. And in the embodiment of FIGS. 1 to 6, sides 29A, 29B are substantially coplanar. In conjunction therewith in cavity 22 the sides of the cross bars 20A, 20B which face each other are substantially plane; for example, and as shown, they are substantially perpendicular to sides 29A and 29B. Thus lateral edges 28A and 28B of cross bars 20A and 20B are each formed by the intersection of two sides of which at least one, and in actual practice both, are substantially plane.

According to the invention the hinged pawl 18 extends generally parallel to the flexible strap 10 toward the latter and is joined to the fastening head 13, and more precisely cross bar 25 thereof, by a hinge 30 of reduced thickness forming the end of notch 31 between the hinged pawl 18 and the rest of the fastening head 13 and therefore in actual practice the cross bar 25 of the fastening head.

According to the invention this notch which extends laterally like a slot, opens outwardly onto surface 33 of hinged pawl 18 opposite the surface on which the retaining teeth 15 are formed. In other words the notch 31 is formed on the outer surface of the face plate 19 opposite or away from passageway 14.

Preferably, and as shown, notch 31 is inclined in relation to the flexible strap 10 and in the illustrated embodiment of FIGS. 1 to 6, from the hinge 30 which forms the closed end of the notch to its open end. The slope of the notch 31 is, for example, between 5° and 30° relative to a normal to the flexible strap 10, and preferably in the vicinity of 15°.

Figure 1:
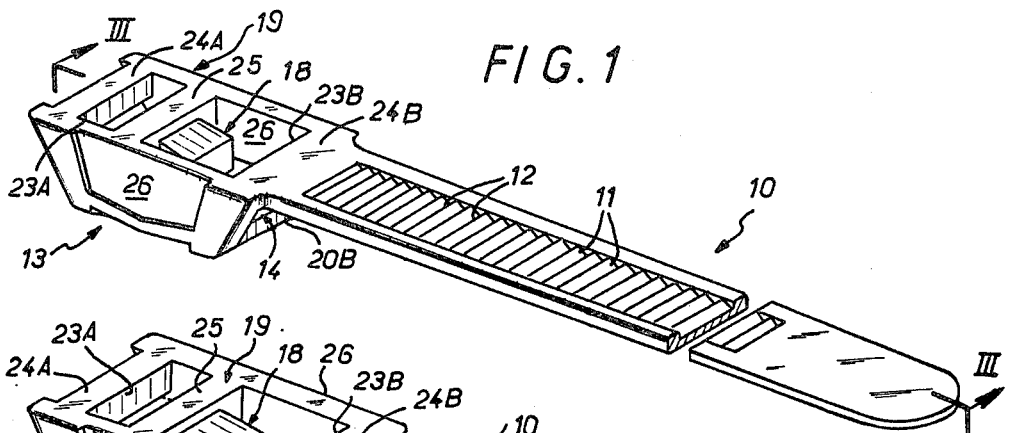
FIG. 1 is a perspective of a cable tie embodying the present invention.
Figure 2:
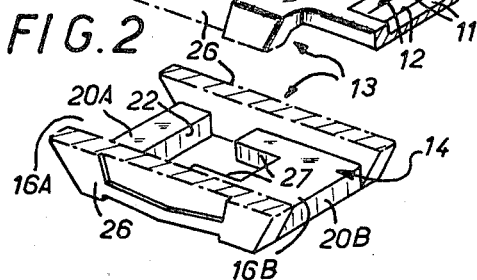
FIG. 2 is an exploded perspective view of only the fastening head of the cable tie of FIG. 1.
Figure 5:
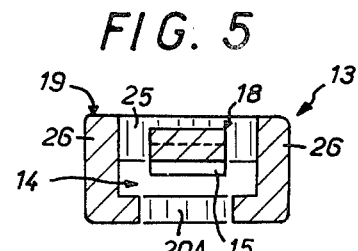
FIG. 5 is a cross-sectional view taken on the line V—V in FIG. 3.
Figure 3:
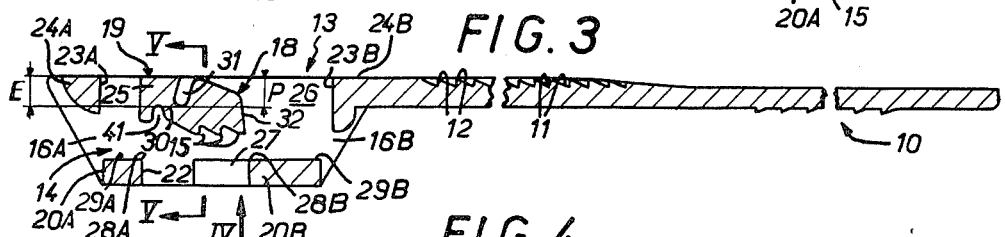
FIG. 3 is a longitudinal sectional view of the cable tie taken on the line III—III in FIG. 1.
Figure 4:
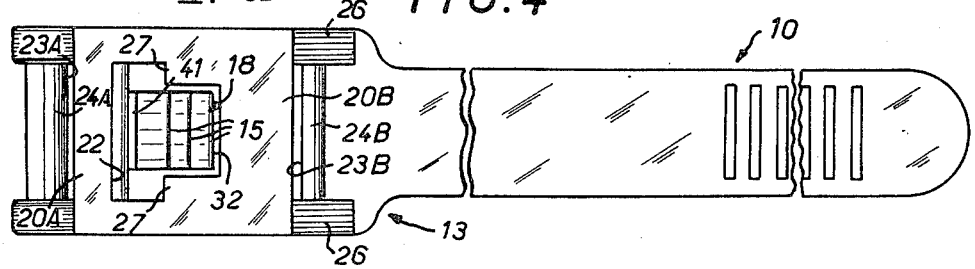
FIG. 4 is a fragmentary plan view of the cable tie taken in the direction of arrow IV in FIG. 3.

As mentioned above, notch 31 herein slopes relative to the flexible strap 10 which is normally assumed to lie flat as shown in FIG. 3 and in practice, just as it is moulded, according to the procedure set out hereinafter.

Preferably, and as illustrated, the depth P of the notch 31 measured from the corresponding free surface of the face plate 19 of the fastening head 12 is at least equal to, or even greater than, the thickness E measured in the same manner at the adjoining region of the fastening head.

In actual practice the adjoining region of the fastening head 13 is formed at the closed end of a groove 41 which, like the notch 31 extends laterally but is formed in the surface of the cross bar 25 facing the passageway 14 and therefore opens inwardly, into the passageway.

Groove 41 which is shallower than notch 31 is longitudinally spaced relative thereto and is located remote from the hinged pawl 18 relative to notch 31.

Further, in the illustrated embodiment the forward end 32 of hinged pawl 18 is inclined away from the flexible strap 10 from the surface bearing the retaining tooth or teeth to the surface opposite thereto.

In this particular embodiment three retaining teeth 15 are provided in the hinged pawl 18.

On account of cavities 22, 23A and 23B in the fastening head 13 the present cable tie advantageously admits of relatively easy moulding. The cable tie may be moulded with dies having main moulding surfaces and junction lines generally parallel to the sides of the flexible strap 10 to be formed flat. The dies have plungers for moulding the opposite sides of the hinged pawl 18 and cross bars 20A and 20B at the location of the aforesaid cavities.

In operation, the flexible strap 10, after being wound around the articles to be bound together, is inserted through the passageway 14 in the fastening head 13 (FIG. 6A) and in order to tighten the hold on the articles a traction force is exerted on the free end extending through the fastening head, as illustrated by arrow $F_1$ in FIG. 6A.

As the strap 10 is being inserted through the passageway 14, the hinged pawl 18 is subjected to rocking or swinging movement in the direction of arrow $F_2$ in FIG. 6A, i.e. toward face plate 19, thereby permitting it to flex out of the way of the crests 12 of the flexible strap 10.

Figure 6B:
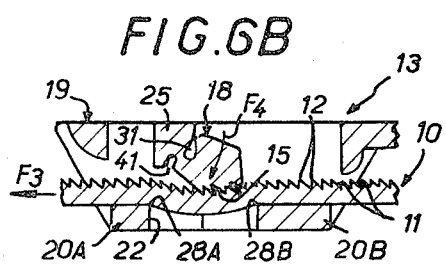

When the traction force exerted on the strap 10 is released, owing to its inherent resiliency the strap is caused to retract or move backwards in the direction of arrow $F_3$ to FIG. 6B.

Since the retaining teeth 15 of the hinged pawl 18 mesh with the ratchet teeth 11 on the flexible strap 10 and owing to the inherent elasticity of the hinged pawl, the retracting or backward movement of the flexible strap causes a rocking or swinging of the hinged pawl 18 in the opposite direction to its previous rocking or swinging, i.e., in a direction which tends to move it away from the face plate 19 as schematically shown by arrow $F_4$ in FIG. 6B. Indeed, the retracting or backward movement of the flexible strap first causes a recoiling or backward movement of the hinged pawl 18; after taking up the gap normally formed by the notch 31 it abuts against the side of the notch on the cross bar 25 and therefore is forced to pivot.

Because the notch 31 slopes from its open end toward the hinge 30, which defines its closed end, in the same direction as the retracting or backward movement of the flexible strap 10 this contributes to the rocking or swinging movement of the hinged pawl 18.

Under the action of the hinged pawl 18 due to its swinging or rocking movement, the flexible strap 10 forcibly wedges between the lateral edge 28B on the exit cross bar 20B and the hinged pawl 18 and thereby the middle cross bar 25.

This fully determines the location of the forces irrespective of the size of the loop defined by the flexible strap.

Thus, as it will be understood, the extensions 27 contribute to maintaining the strap in proper alignment parallel to the face plate 19 and the slope of the front side 32 of the hinged pawl 18 precludes the front side from interfering with the swinging movement of the hinged pawl.

In actual practice urged by the hinged pawl 18 the flexible strap 10 slightly buckles at the cavity 22 opposite the hinged pawl, as shown in FIG. 6B, where the buckling of the strap has been purposely exaggerated for the sake of clarity.

In actual practice since the entrance cross bar 20B is provided in the embodiment illustrated in FIGS. 1 to 6, the flexible strap 10 urged by the hinged pawl 18 arches between the edges 28A and 28B on cross bars 20A and 20B and the retaining teeth 15 on the hinged pawl 18 and therefore, by its agency, cross bar 25.

In the alternative embodiment illustrated in FIG. 7, the side extentions on the exit cross bar 20B are eliminated and sides 29A and 29B of cross bars 20A and 20B facing the face plate 19 together define an upwardly opening dihedron to help accentuate the buckling deformation of the strap 10.

The alternative embodiment illustrated in FIG. 8 comprises, as in FIGS. 1 to 6, side extentions 27 but in the passageway 14 the free ends 42 of the side extensions are slightly rounded to facilitate insertion of the free end of the flexible strap into the passageway 14.

Further, in this alternative embodiment, the entrance cross bar 20A is eliminated and so is the corresponding cross bar 24A of the face plate 19. In this case the face plate simplifies down to cross bars 24A and 25 thereby advantageously reducing the amount of material required for making the cable tie without jeopardising its mechanical performance.

Finally, in this embodiment, the bottoms of the ratchet teeth 11 on the strap are flat and the crests of the retaining teeth on the hinged pawl are correspondingly truncated.

The invention is applicable to unmounted cable ties adapted to tie any kind of article or cable ties having a mounting base on the fastening head for permanently securing it to any kind of fixed support. Such an arrangement is illustrated in FIGS. 9 and 10 in which general reference 35 designates the mounting base. Such a mounting base is provided with a hole 36 for any kind of fastener such as a nail or screw. Preferably, as shown, the hole is threaded.

According to the invention, and as represented, the mounting base 35 flanks the fastening head sidewise so that permanent free access is given to the associated fastener, whether the strap is in its closed or open position.

To confer good rigidity the mounting base 35 is made rather high and this also applies to the fastening head 13 itself.

To facilitate the moulding of the exit cross bar itself and reduce the weight the exit bar 20B has a recess or blind cavity.

Preferably, as shown, the mounting base 35 extends over the entire height of the fastening head 13, and like the fastening head, defines a cradle like upper surface which enables it to contribute to the support of the article or articles being bundled.

It will be noted that in all the above described embodiments once the flexible strap 10 is looped it precludes access to the hinged pawl 18 and thereby an accidental operation of the hinged pawl which might possibly cause the release of the flexible strap.

In addition, once the strap is looped around cables, wires or other articles it has to tie into a bundle, the ratchet teeth 11 and the crests 12 thereon are disposed inside the loop in order to reduce the surface which is exposed to any possible ultraviolet radiation or other foreign agents liable to degrade the plastics material of which the cable tie is made. This is likewise applicable to the hinged pawl 18 which is also protected.

The opposite arrangement as shown in FIG. 12 does not, however, depart from the present invention. In this embodiment the face plate 19 is substantially the continuation of the flexible strap 10 and is formed by two cross bars 20A and 20B and the hinged pawl 18 is carried by cross bar 25 is located between cross bars 20A, 20B on the other side of passageway 14 relative to cross bars.

Likewise, although in the foregoing the description the strap must be inserted into the strap-receiving passageway from the end remote from the attachment of the fastening head to the strap, arrangements in which the strap is received into the end of the passageway adjacent the attachment to the fastening head do not depart from the scope of the present invention. In this case, however, the advantage of having relatively slight fastening head projection after bundling one or more articles would be lost. In this case the hinged pawl 18 must extend away from the strap and the notch is sloped from the hinge which forms the closed end of the notch to the open end of the notch in the direction of retracting or backward movement of the strap subsequent to the release of traction force exerted during tightening.

The present invention is, moreover, not limited to the various described and illustrated embodiments but encompasses all modification, variations and expedients without departing from the scope of the appended claims.

What I claim is:

1. A cable tie of one-piece construction, comprising a flexible strap having a plurality of lateral ratchet teeth on one side of said strap and a fastening head having a passageway extending parallel to said strap and adapted to receive said strap to form a loop, a hinged pawl having at least one retaining tooth disposed at an end thereof adapted to mesh with any of said plurality of ratchet teeth and a hinge of reduced thickness joining said hinged pawl to said fastening head, said hinged pawl extending generally parallel to said strap, a notch separating said hinged pawl from the rest of said fastening head, said hinge defining the closed end of said notch, and said notch opening outwardly onto a surface of said hinged pawl opposite to a surface on which said retaining tooth is formed.

2. The cable tie according to claim 1, wherein said notch is inclined in relation to said strap.

3. The cable tie according to claim 2, said hinged pawl extending toward said strap, wherein said notch being generally acutely inclined toward said strap from its closed end to its open end.

4. The cable tie according to claim 2 or 3, wherein the depth of said notch measured from a reference face of said fastening head at the open end of said notch is equal to or greater than the thickness of an adjoining region of said fastening head.

5. The cable tie according to claim 1 or 3, a groove extending laterally inside said fastening head and opening into said passageway, said groove being longitudinally spaced from said notch remote from said hinged pawl in relation to said notch.

6. The cable tie according to claim 1 or 3, said passageway being formed between an entrance cross bar and an exit cross bar and spaced from a face plate on said fastening head, wherein sides of said cross bars facing said hinged pawl are substantially plane and together define a dihedron opening toward said hinged pawl.

7. The cable tie according to claim 1 or 3, said passageway being formed between an entrance cross bar and an exit cross bar and spaced from a face plate on said fastening head, wherein sides of said cross bars facing said hinged pawl are substantially coplanar.

8. The cable tie according to claim 1, further comprising a mounting base having a fastener hole, said mounting base extending the entire length of said fastening head, to one side thereof offset from the strap.

9. The cable tie according to claim 7, said mounting base and said fastening head both having cradle like upper surfaces generally in alignment with each other.

* * * * *